United States Patent
Kim et al.

(10) Patent No.: US 9,735,408 B2
(45) Date of Patent: Aug. 15, 2017

(54) SECONDARY BATTERY

(71) Applicant: Samsung SDI Co., Ltd., Yongin-si, Gyeonggi-do (KR)

(72) Inventors: Hyun-Chul Kim, Yongin-si (KR); Hyun Soh, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 129 days.

(21) Appl. No.: 14/510,065

(22) Filed: Oct. 8, 2014

(65) Prior Publication Data
US 2015/0147605 A1 May 28, 2015

(30) Foreign Application Priority Data
Nov. 27, 2013 (KR) .......... 10-2013-0145001

(51) Int. Cl.
*H01M 2/12* (2006.01)
*H01M 10/0525* (2010.01)

(52) U.S. Cl.
CPC .......... *H01M 2/127* (2013.01); *H01M 2/1235* (2013.01); *H01M 10/0525* (2013.01); *H01M 2200/00* (2013.01); *H01M 2200/20* (2013.01); *H01M 2220/30* (2013.01)

(58) Field of Classification Search
CPC .......... H01M 2/1235; H01M 2200/20; H01M 10/0525; H01M 2/127; H01M 2200/00; H01M 2200/30; H01M 2/12
See application file for complete search history.

(56) References Cited

U.S. PATENT DOCUMENTS

| | | | | |
|---|---|---|---|---|
| RE31,458 E | * | 12/1983 | Trattner | H01M 2/105 429/100 |
| 2008/0199768 A1 | * | 8/2008 | Wada | H01M 2/0257 429/127 |
| 2008/0241684 A1 | * | 10/2008 | Muraoka | H01M 2/16 429/209 |
| 2009/0197153 A1 | | 8/2009 | Fujikawa et al. | |
| 2009/0226803 A1 | * | 9/2009 | Nishino | H01G 9/12 429/149 |
| 2011/0206957 A1 | | 8/2011 | Byun | |
| 2014/0127538 A1 | | 5/2014 | Uruno et al. | |

(Continued)

FOREIGN PATENT DOCUMENTS

| | | | | |
|---|---|---|---|---|
| CN | 201478387 U | * | 5/2010 | ............ H01M 10/04 |
| CN | 102403467 A | | 4/2012 | |
| EP | 2 849 257 A1 | | 3/2015 | |

(Continued)

OTHER PUBLICATIONS

Hawley's Condensed Chemical Dictionary online Mar. 15, 2007—Aluminum entry.*

(Continued)

*Primary Examiner* — Patrick Ryan
*Assistant Examiner* — Aaron Greso
(74) *Attorney, Agent, or Firm* — Lewis Roca Rothgerber Christie LLP (57) ABSTRACT

A secondary battery includes a case, a cap plate, and a vent portion. The case accommodates an electrode assembly therein and has an open top. The cap plate seals the top of the case. The vent portion is at one area of the cap plate. A porous safety member is at a position adjacent to the vent portion.

17 Claims, 4 Drawing Sheets

(56) References Cited

U.S. PATENT DOCUMENTS

2015/0079426 A1   3/2015   Chen et al.

FOREIGN PATENT DOCUMENTS

| JP | 2008-117534 | 5/2008 |
| JP | 2010-080352 | 4/2010 |
| KR | 10-1997-0031013 | 6/1997 |
| KR | 10-2008-0037862 | 5/2008 |
| KR | 10-2011-0097573 A | 8/2011 |
| WO | WO 2013/011915 A1 | 1/2013 |

OTHER PUBLICATIONS

EPO Office action dated Apr. 7, 2015, for corresponding European Patent application 14193873.8, (6 pages).
KIPO Office Action dated Aug. 11, 2016, for corresponding Korean Patent Application No. 10-2013-145001 (6 pages).
EPO Office Action dated Oct. 11, 2016, for corresponding European Patent Application No. 14193873.8 (4 pages).

* cited by examiner

SECONDARY BATTERY

CROSS-REFERENCE TO RELATED APPLICATION

This application claims priority to and the benefit of Korean Patent Application No. 10-2013-0145001, filed on Nov. 27, 2013 in the Korean Intellectual Property Office, the contents of which are incorporated herein by reference in their entirety.

BACKGROUND

1. Field

An aspect of embodiments of the present invention relates to a secondary battery.

2. Description of the Related Art

In general, unlike primary batteries which are not designed to be recharged, secondary batteries refer to batteries which are designed to be recharged. The secondary batteries are widely used in fields of electronic devices, such as cellular phones, notebook computers, and camcorders.

Among various kinds of secondary batteries, lithium secondary batteries are widely used due to their relatively high operating voltage and energy density per unit weight. The lithium secondary batteries are manufactured in various shapes, and representative shapes thereof may include a cylindrical shape, a can shape, a pouch shape, and the like.

Gas is generated by a reaction with an active material or electrolyte inside a secondary battery. When a space (e.g., a bubble) is formed inside the secondary battery by the gas, there is formed a region in which the function of the active material is lost or the movement of lithium ions in the electrolyte is interrupted, thereby shortening the lifespan of the secondary battery. When the generated gas accumulates, the internal pressure of the secondary battery increases and the secondary battery swells, and therefore, a risk of explosion may exist.

Accordingly, it is desirable to prevent the function of the active material from being lost by exhausting the gas generated inside the secondary battery to outside of the secondary battery and remove bubbles generated in the electrolyte. To this end, a vent portion may be formed so that a portion of a case is fractured when the internal pressure of the secondary battery increases.

SUMMARY

Aspects of embodiments of the present invention are directed to a secondary battery having improved safety in which a porous metal is formed at a top and/or a bottom of (e.g., above and/or below) a vent portion so that it is possible to prevent a flame from being emitted (e.g., spouted) to the outside of the secondary battery through the vent portion.

Aspects of embodiments of the present invention are also directed toward a secondary battery which can reduce a concentration of oxygen at the vent portion and a temperature caused by a runaway generation of heat inside the secondary battery to prevent a flame from being emitted (e.g., spouted) to the outside of a vent portion.

According to an embodiment of the present invention, there is provided a secondary battery, including: a case accommodating an electrode assembly therein, the case having an open top; a cap plate sealing the top of the case; and a vent portion at one area of the cap plate, wherein a porous safety member is at a position adjacent to the vent portion.

The safety member may include a metallic material.

The safety member may include at least one selected from the group consisting of aluminum (Al), copper (Cu), and titanium (Ti).

The safety member may have a foam, mesh or wire scrap shape.

The safety member may be above the vent portion.

The safety member may have an open space at a surface above the vent portion, and the safety member and the vent portion may be spaced from each other.

The safety member may be below the vent portion.

The safety member may be between the electrode assembly and the cap plate inside the case.

The safety member may include a metal having a melting point greater than or equal to 500° C.

The safety member may include titanium or alumina.

Support members may be at respective ends of the safety member.

The secondary battery may further include another porous safety member, and one of the safety members may be above the vent portion, and the other one of the safety members may be below the vent portion.

The porous safety member may have a plurality of pores in a range from 10 to 100 pores per inch (ppi).

At least one selected from the group consisting of a heat absorbing material, a cooling material, and a material causing incomplete combustion may be on the porous safety member.

According to aspects of embodiments of the present invention, a flame generated inside the case reacts inside the secondary battery and is not emitted to (e.g., extended to) the outside of the secondary battery so that it is possible to prevent consecutive or reoccurring reactions from being additionally generated and to minimize or reduce the occurrence of reactions inside the secondary battery.

That is, due to the porous metal formed at the top and/or the bottom of (e.g., above and/or below) the vent portion, it is possible to reduce the concentration of oxygen at the vent portion and the temperature caused by a runaway generation of heat inside the secondary battery, thereby minimizing or reducing consecutive or reoccurring reactions caused by the runaway generation of heat (e.g., a short circuit).

BRIEF DESCRIPTION OF THE DRAWINGS

Example embodiments will now be described more fully hereinafter with reference to the accompanying drawings; however, the present invention may be embodied in different forms and should not be construed as limited to the embodiments set forth herein. Rather, these embodiments are provided so that this disclosure will be thorough and complete, and will fully convey the scope of the disclosure to those skilled in the art.

In the figures, dimensions may be exaggerated for clarity of illustration. It will be understood that when an element is referred to as being "between" two elements, it can be the only element between the two elements or one or more intervening elements may also be present. Like reference numerals refer to like elements throughout.

DETAILED DESCRIPTION

In the following detailed description, only certain example embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. It will be understood that when an element or layer is referred to as being "on", "connected to", or "coupled to" another element or layer, it may be directly on, connected, or coupled to the other element or layer or one or more intervening elements or layers may also be present. When an element is referred to as being "directly on", "directly connected to", or "directly coupled to" another element or layer, there are no intervening elements or layers present. Hereinafter, like reference numerals refer to like elements. In the drawings, the thickness or size of layers may be exaggerated for clarity and not necessarily drawn to scale. As used herein, the term "and/or" includes any and all combinations of one or more of the associated listed items. Further, the use of "may" when describing embodiments of the present invention relates to "one or more embodiments of the present invention".

Figure 1:
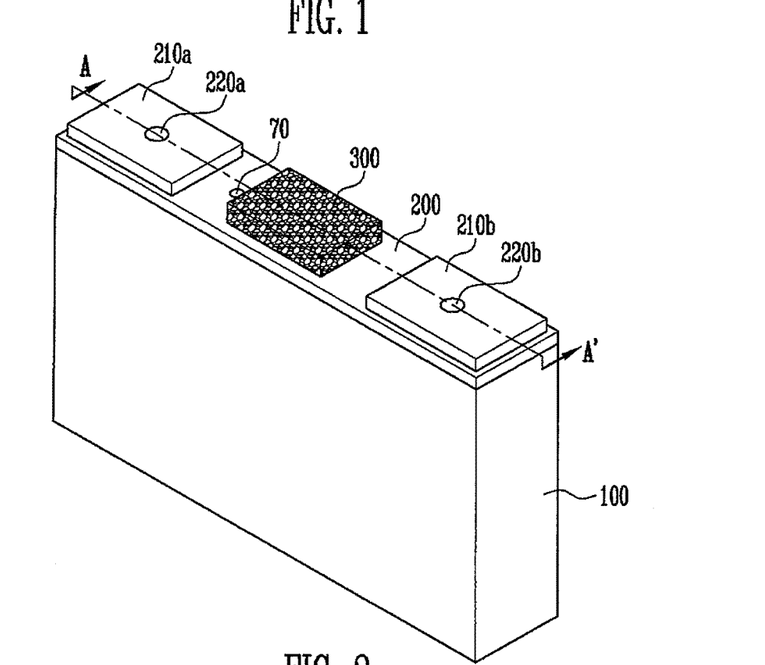
FIG. 1 is a perspective view showing a secondary battery according to a first embodiment of the present invention.
Figure 2:
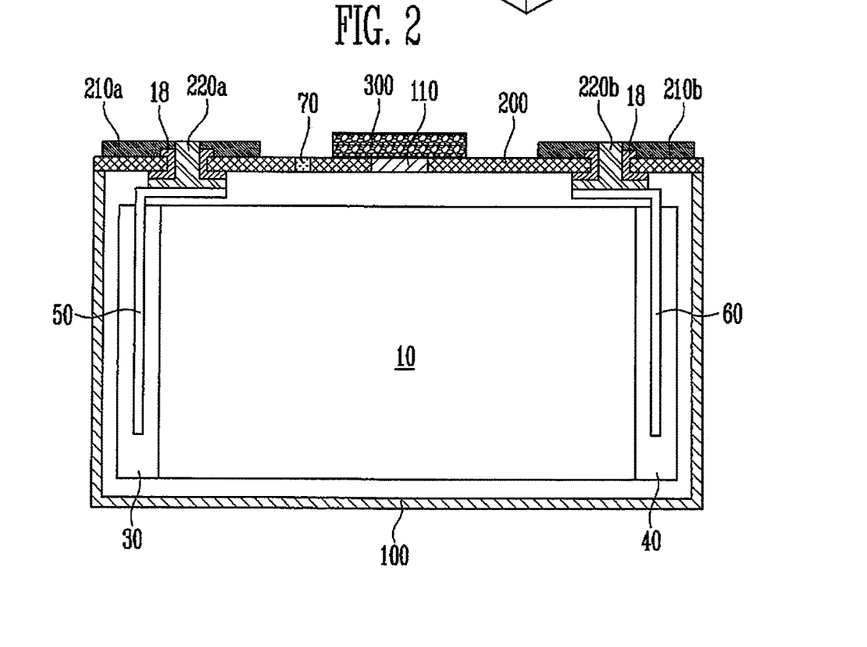
FIG. 2 is a sectional view taken along the line A-A' of FIG. 1.

FIG. 1 is a perspective view showing a secondary battery according to a first embodiment of the present invention. FIG. 2 is a sectional view taken along the line A-A' of FIG. 1.

Referring to FIGS. 1 and 2, the secondary battery according to this embodiment includes a case 100 configured to have an opened top, the case 100 accommodating an electrode assembly 10 therein, and a cap plate 200 configured to seal the opened top of the case 100. A vent portion 110 is formed at one area of the cap plate 200, and a porous safety member 300 is positioned at an area adjacent to the vent portion 110 (e.g., at a top of or over the vent portion 110).

The vent portion 110 may be formed by changing or varying a portion of the cap plate 200 or may be formed by disposing a separate component in the cap plate 200. For example, the vent portion 110 may be formed thinner than other portions of the cap plate 200 to be fractured according to a reference internal pressure (e.g., a set internal pressure). Alternatively, a fracture line (e.g., a groove or score line) may be formed in the vent portion 110 so that the vent portion 110 can be easily fractured by an internal pressure of the case 100.

Accordingly, the vent portion 110 operates (e.g., the vent portion 110 is configured to burst or open) before the internal pressure of the case 100 reaches a relatively high pressure to an extent where the cap plate 200 or the case 100 is broken. When the vent portion 110 operates, internal gas is exhausted to the outside of the case 100, thereby preventing an explosion of the case 100.

However, in a case where the vent portion 110 is opened as described above, internal contents of the case 100 are emitted to (e.g., spouted to) the outside of the case 100 due to a runaway generation of heat inside the secondary battery. In this case, when the internal contents are emitted to (e.g., spouted to) the outside of the case 100, the internal contents are rapidly exposed to external oxygen and a flame may be formed. The flame remarkably deteriorates the safety of the secondary battery and may promote consecutive external reactions or induce secondary ignition.

When the runaway generation of heat inside and/or the internal contents of the secondary battery are emitted to outside the secondary battery, a concentration of the oxygen at a contact area between the internal contents and the external oxygen should be reduced or minimized. Accordingly, the porous safety member 300 is installed at the area adjacent to the vent portion 110 so that a flame is not exposed to or generated at the outside of the secondary battery by diffusing and/or cooling the heat and the internal contacts at the contact area between the heat and the internal contents and the external oxygen.

Here, the safety member 300 may be formed of a metallic material. For example, the safety member 300 may include at least one selected from the group consisting of aluminum (Al), copper (Cu), and titanium (Ti). However, the safety member 300 may be formed of various metals as well as the metallic material (e.g., the safety member 300 may be an alloy). That is, the material of the safety member 300 is not limited.

The safety member 300 may be formed in the shape of foam, mesh, wire scrap, or the like. That is, the safety member 300 has a shape with pores.

In this case, the pores of the porous safety member 300 are formed to be in a range from about 10 to about 100 ppi (pores per inch). When the pores of the safety member 300 are formed to be less than about 10 ppi, the vent portion 110 is completely sealed (e.g., hermetically sealed), and therefore, the internal gas may not be exhausted when the vent portion 110 opens. When the pores of the safety member 300 are formed to exceed about 100 ppi, the flame is not prevented from being radiated to the outside of the case 100 (e.g., the flame is not diffused as it is emitted from the case 100), and therefore, it is insignificant that the safety member 300 is formed at the top of the vent portion 110.

Here, ppi as a unit indicating the number of pores in the safety member 300 formed on a one-inch line. In this case, the pores may be formed at an equal or substantially equal interval. The size of the pores of the safety member 300 formed in the shape of foam, mesh, or wire scrap may be measured using a microscope and an image analyzer.

Hereinafter, the case 100, the electrode assembly 10 accommodated in the case 100, and the cap plate 200 for sealing the top of the case 100 will be further described.

The electrode assembly 10 includes a positive electrode plate, a negative electrode plate, and a separator therebetween. The stacked structure of the positive electrode plate, the negative electrode plate, and the separator is wound in, for example, a jelly-roll shape.

The positive electrode plate includes a positive electrode collector and a positive electrode active material layer formed on at least one surface of the positive electrode collector. In addition, a positive electrode non-coating portion on which a positive electrode active material is not formed is disposed at one edge along the width direction of the positive electrode collector. The negative electrode plate includes a negative electrode collector and a negative electrode active material layer formed on at least one surface of the negative electrode collector. In addition, a negative electrode non-coating portion on which a negative electrode active material is not formed is disposed at one edge along the width direction of the negative electrode collector.

In this case, the positive and negative electrode non-coating portions are disposed at edges opposite to each other along the width direction of the electrode assembly 10. The electrode assembly 10 is inserted into the case 100 so that the positive and negative electrode non-coating portions are positioned at the left and right sides of the case 100. A positive electrode collector plate 30 is electrically coupled (e.g., electrically connected) to the positive electrode non-coating portion, and a negative electrode collector plate 40 is electrically coupled (e.g., electrically connected) to the negative electrode non-coating portion. Here, the connection between the positive electrode non-coating portion and the positive electrode collector plate 30 and the connection between the negative electrode non-coating portion and the negative electrode collector plate 40 may be performed through, for example, ultrasonic welding.

The cap plate 200 is used to seal the top of the case 100, and the contact portion between the cap plate 200 and the case 100 may be hermetically formed by, for example, laser welding. When the internal pressure of the case 100 exceeds a set value, a safety vent forms an exhaust path of gas in (e.g., through) the cap plate 200. In addition, an electrolyte injection hole for injecting an electrolyte into the case 100 is formed in the cap plate 200 and a sealing stopper 70 for closing the electrolyte injection hole is formed in the electrolyte injection hole.

The positive electrode collector plate 30 is electrically coupled (e.g., electrically connected) to a positive electrode terminal 220a by a positive electrode lead member 50. The positive electrode terminal 220a is extended to (e.g., extracted to) the outside of the case 100 by passing through the cap plate 200. The positive electrode terminal 220a may protrude a length (e.g., a predetermined length) above the top of the cap plate 200. The negative electrode collector plate 40 is electrically coupled (e.g., electrically connected) to a negative electrode terminal 220b by a negative electrode lead member 60. The negative electrode terminal 220b may also protrude a length (e.g., a predetermined length) above the top of the cap plate 200.

A gasket 18 is between the cap plate 200 and each of the positive and negative electrode terminals 220a and 220b. Accordingly, the cap plate 200 and each of the positive and negative electrode terminals 220a and 220b may be coupled in a state in which they are insulated from each other. The positive and negative electrode terminals 220a and 220b are respectively coupled to positive and negative electrode terminal plates 210a and 210b positioned at the top of the cap plate 200.

Figure 3:
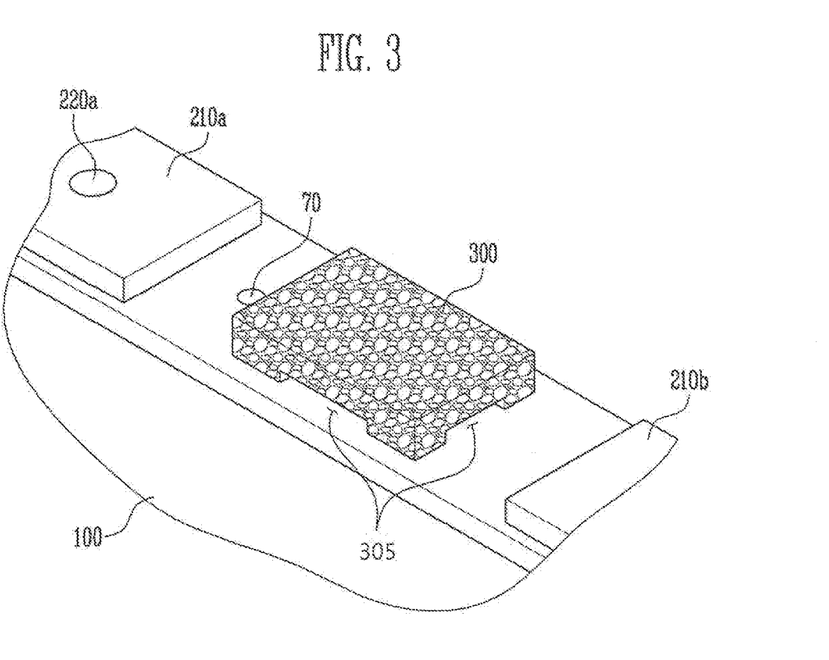
FIG. 3 is an enlarged partial perspective view showing a safety member of a secondary battery according to a second embodiment of the present invention.

FIG. 3 is an enlarged partial perspective view showing a safety member of a secondary battery according to a second embodiment of the present invention.

Referring to FIG. 3, the secondary battery according to this embodiment includes a case 100 configured to have an opened top, the case 100 accommodating an electrode assembly 10 therein, and a cap plate 200 configured to seal the opened top of the case 100. A vent portion 110 is formed at one area of the cap plate 200, and a porous safety member 300 is formed at a top of (e.g., formed over) the vent portion 110. The porous safety member 300 may be formed of a metallic material. The porous safety member 300 may be formed in the shape of foam, mesh, wire scrap, or the like.

In this case, a groove portion 305 (e.g., an opened portion) is formed at a surface of the safety member 300 corresponding to the vent portion 110 (e.g., a bottom surface of the safety member 300). Accordingly, the safety member 300 and the vent portion 110 are partially spaced apart from each other (e.g., portions of the safety member 300 and the vent portion 110 are spaced apart from each other) so as to not interfere with the fracture of the vent portion 110. That is, the safety member 300 is formed in the shape of a hexahedron. Thus, only four corner areas of a lower portion of the safety member 300 are contacted with the cap plate 200 (e.g., the vent portion 11 0), and a central portion of the vent portion 110 is spaced from (e.g., spaced apart from) the safety member 300.

When internal contents are emitted to (e.g., spouted to) the outside of the case 100 due to a runaway generation of heat inside the secondary battery, the safety member 300 prevents the internal contents from being contacted with excess oxygen (e.g., the safety member 300 reduces the amount of external oxygen the internal contents contact when the internal contents are emitted from the secondary battery), thereby suppressing the occurrence of a flame. That is, the concentration of the oxygen that contacts the emitted internal contents and the reaction temperature caused by the runaway generation of heat at the vent portion 110 are both reduced so that it is possible to prevent a flame from being generated and/or radiated to the outside of the case 100. Although the safety member 300 is formed at the top of (e.g., over) the vent portion 110, the safety member 300 is formed of a material having a plurality of pores. Thus, the safety member 300 enables gas to be easily exhausted from the vent portion 110.

Figure 4:
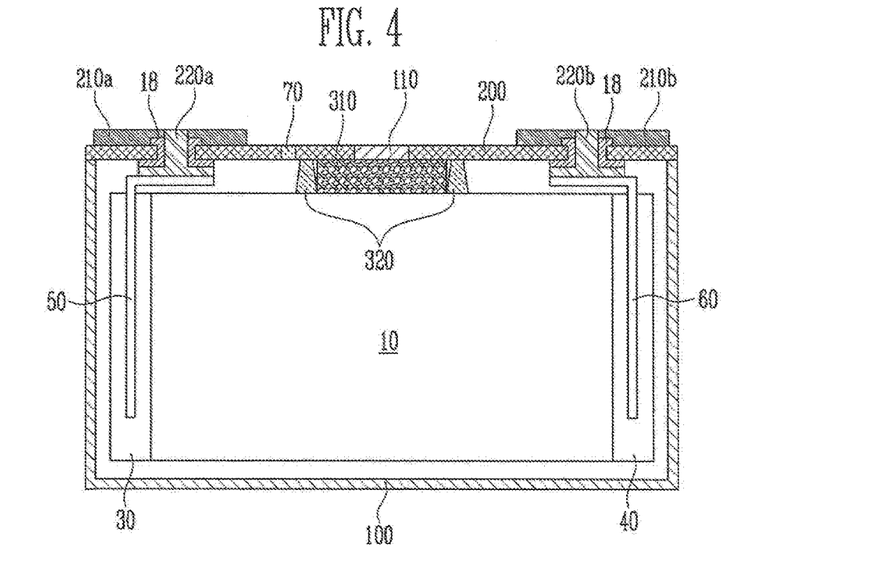
FIG. 4 is a sectional view showing a secondary battery according to a third embodiment of the present invention.

FIG. 4 is a sectional view showing a secondary battery according to a third embodiment of the present invention.

Referring to FIG. 4, the secondary battery according to this embodiment includes a case 100 configured to have an opened top, the case 100 accommodating an electrode assembly 10 therein, and a cap plate 200 configured to seal the opened top of the case 100. A vent portion 110 is formed at one area of the cap plate 200, and a porous safety member 310 is formed at a bottom of (e.g., below) the vent portion 110.

In this case, the safety member 310 is formed at the bottom of (e.g., below) the vent portion 110 (e.g., at a position corresponding to the vent portion 110 between the electrode assembly 10 and the cap plate 200). In order to prevent movement (e.g., lateral and/or vertical movement) of the safety member 310, support members 320 may be respectively formed at both ends of the safety member 310. Here, the support members 320 may be formed of an insulative material.

When the safety member 310 is positioned inside the case 100, the safety member 310 is formed of a metal having a melting point of about 500° C. or more so as to endure the runaway generation of heat (e.g., the excess heat) inside the secondary battery. In addition, the safety member 310 should be formed of a metal which does not react with an electrolyte inside the case 100. For example, the safety member 310 positioned inside the case 100 may be formed of a material such as titanium (Ti) or alumina ($Al_2O_3$).

In this embodiment, when the safety member 310 is positioned inside the case 100, it is possible to prevent the heat and/or the internal contents of the case 100 from being emitted to (e.g., spouted to) the outside of the case 100 due to a runaway generation of heat inside the case 100. Accordingly, it is possible to prevent contents inside the case from being contacted with excess oxygen when they are emitted to (e.g., spouted to) the outside of the case, thereby minimizing or reducing the occurrence of consecutive reactions and/or a flame.

Figure 5:
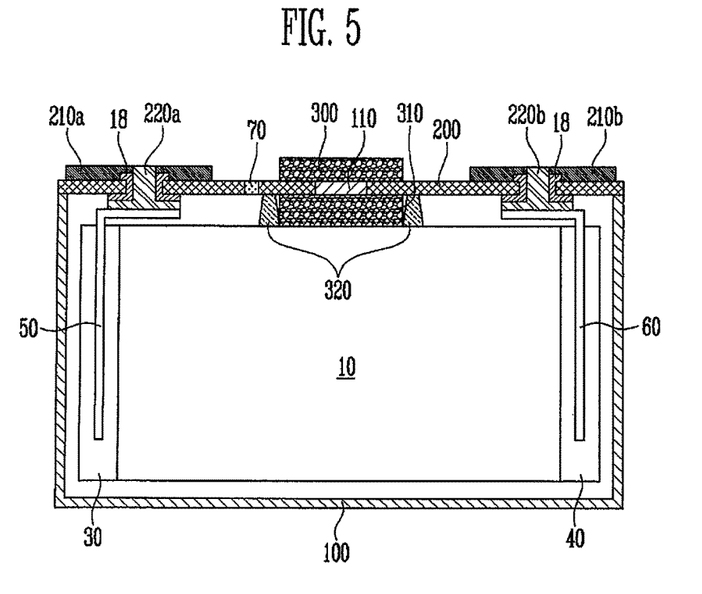
FIG. 5 is a sectional view showing a secondary battery according to a fourth embodiment of the present invention.

FIG. 5 is a sectional view showing a secondary battery according to a fourth embodiment of the present invention.

Referring to FIG. 5, the secondary battery according to this embodiment includes a case 100 configured to have an opened top, the case 100 accommodating an electrode assembly 10 therein, and a cap plate 200 configured to seal the opened top of the case 100. A vent portion 110 is formed at (e.g., in) one area of the cap plate 200, and porous safety members 300 and 310 are respectively formed at a top and a bottom of (e.g., above and below) the vent portion 110.

The safety member 310 formed at the bottom of (e.g., below) the vent portion 110 is formed at a position corresponding to the vent portion 110 between the cap plate 200 and the electrode assembly 10. Support members 320 are respectively formed at both ends of the safety member 310 formed at the bottom of the vent portion 110 to prevent movement of the safety member 310.

As the safety members 300 and 310 are respectively formed at the top and bottom of (e.g., above and below) the vent portion 110, it is possible to prevent internal contents and/or heat generated inside the case 100 from being emitted to (e.g., spouted to) the outside of the case 100 and to prevent a flame from being generated at and/or emitted to (e.g., spouted to) the outside of the case 100. That is, a flame source generated inside the case 100 reacts inside the secondary battery and does not extend to the outside of the secondary battery so that consecutive reactions and/or flames cannot be generated (e.g., cannot be additionally generated).

Figure 6:
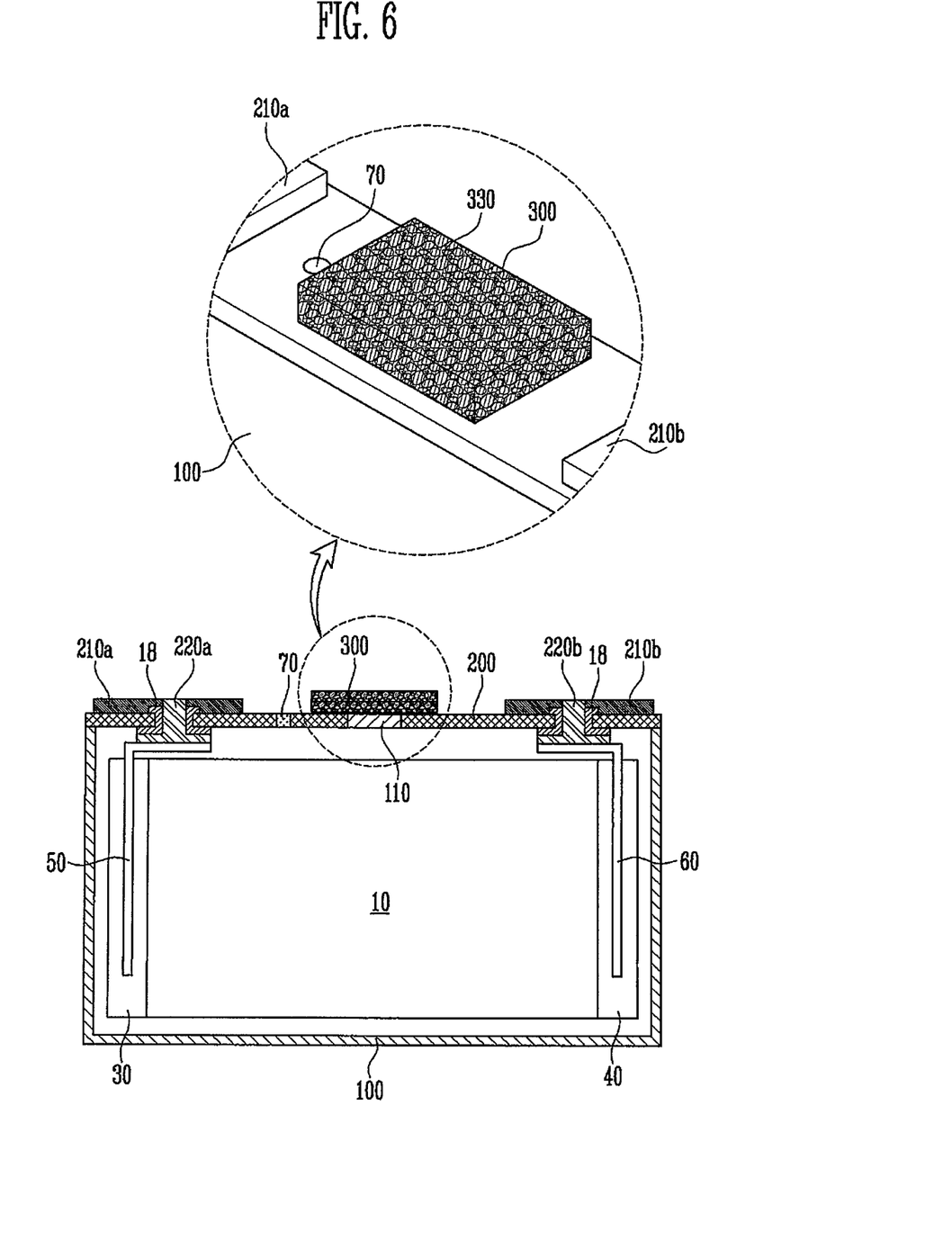
FIG. 6 is a sectional view showing a secondary battery according to a fifth embodiment of the present invention.

FIG. 6 is a sectional view showing a secondary battery according to a fifth embodiment of the present invention.

Referring to FIG. 6, in the secondary battery according to this embodiment, a porous safety member 300 is formed at a top of (e.g., above) a vent portion 110 of a cap plate 200. The safety member 300 is formed of a metallic material. The safety member 300 may be formed of aluminum (Al), copper (Cu), titanium (Ti), or an alloy thereof.

The safety member 300 may be formed in a shape having a plurality of pores, such as foam, mesh, or wire scrap. In this case, the pores of the safety member 300 may be formed in a range from about 10 to about 100 ppi, and at least one selected from the group consisting of a heat absorbing material, a cooling material, and a material causing incomplete combustion (e.g., a fire retardant material) may be applied to the safety member 300 (e.g., applied to the pores of the safety member 300).

Accordingly, the concentration of external oxygen and the temperature of ignition are reduced by the heat absorbing material, the cooling material, or the material causing incomplete combustion so that a number and/or possibility of consecutive reactions can be remarkably reduced. Further, it is possible to minimize or reduce the runaway generation of heat from reacting inside the secondary battery.

Although it has been described in this embodiment that the safety member is formed having a plurality of pores, the safety member may be formed as a plurality of thin sheets, where empty spaces form a zigzag pattern or are arranged at random. In this case, it is possible to provide substantially the same or the same effect as that described according to aspects of the embodiments of the present invention.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims and their equivalents.

What is claimed is:

1. A secondary battery comprising:
   a prismatic case accommodating an electrode assembly therein, the case having an open top and comprising a positive electrode terminal and a negative electrode terminal;
   a cap plate sealing the top of the case and comprising a vent portion, the vent portion being configured to burst in response to increased pressure in the case, the positive and negative electrode terminals protruding through the cap plate, being electrically insulated from the cap plate, and being at opposite ends of the cap plate; and
   a porous safety member at a position adjacent to the vent portion between an area of the cap plate at where the positive electrode terminal protrudes and another area of the cap plate at where the negative electrode terminal protrudes, the safety member being electrically isolated from the positive and negative electrode terminals,
   wherein the safety member is above the vent portion,
   wherein the safety member has a groove recessed from a surface of the vent portion such that a center portion of the safety member and the vent portion are spaced from each other, and
   wherein the groove opens to an outer edge of the safety member.

2. The secondary battery of claim 1, wherein the safety member comprises a metallic material.

3. The secondary battery of claim 2, wherein the safety member comprises at least one selected from the group consisting of aluminum (Al), copper (Cu), and titanium (Ti).

4. The secondary battery of claim 1, wherein the safety member has a foam, mesh, or wire scrap shape.

5. A secondary battery comprising:
   a prismatic case accommodating an electrode assembly therein, the case having an open top;
   a cap plate sealing the top of the case and comprising a vent portion; and
   a porous safety member at a position adjacent to the vent portion and between the electrode assembly and the cap plate inside the case, the porous safety member having a plurality of pores in a range from 10 to 100 pores per inch (ppi) and being electrically isolated from the electrode assembly,
   wherein the safety member is above the vent portion,
   wherein the safety member has a groove recessed from a surface of the vent portion such that a center portion of the safety member and the vent portion are spaced from each other, and
   wherein the groove opens to an outer edge of the safety member.

6. The secondary battery of claim 1, wherein the safety member comprises a metal having a melting point equal to or greater than 500° C.

7. The secondary battery of claim 1, wherein the safety member comprises titanium or alumina.

8. The secondary battery of claim 1, wherein support members are at respective ends of the safety member.

9. The secondary battery of claim 1 further comprising another porous safety member, wherein one of the safety members is above the vent portion, and the other one of the safety members is below the vent portion.

10. The secondary battery of claim 9, wherein the other one of the safety members is at a position corresponding to the vent portion and between the electrode assembly and the cap plate inside the case.

11. The secondary battery of claim 9, wherein the other one of the safety members comprises a metal having a melting point greater than or equal to 500° C.

12. The secondary battery of claim 9, wherein the other one of the safety members comprises titanium or alumina.

13. The secondary battery of claim 9, wherein support members are at respective ends of the other one of the safety members.

14. The secondary battery of claim 9, wherein the one of the safety members has an open space at a surface above the vent portion, and the one of the safety members and the vent portion are spaced from each other.

15. The secondary battery of claim 1, wherein the porous safety member has a plurality of pores in a range from 10 to 100 pores per inch (ppi).

16. The secondary battery of claim 1, wherein at least one selected from the group consisting of a heat absorbing material, a cooling material, and a material causing incomplete combustion is on the porous safety member.

17. The secondary battery of claim 1, wherein the porous safety member has a plurality of grooves recessed from an upper surface of the cap plate, a first one of the grooves having a first axis in a length direction of the cap plate and a second one of the grooves having a second axis crossing the first axis,
  wherein the first and second grooves open to an outer edge of the safety member, and
  wherein the positive terminal and the negative terminal are spaced from each other in the length direction of the cap plate.

* * * * *